United States Patent [19]
Hannoosh et al.

[11] 4,379,670
[45] Apr. 12, 1983

[54] LINEAR POCKET LETDOWN DEVICE

[75] Inventors: James G. Hannoosh, Sudbury; Andrew C. Harvey, Waltham; John C. Harding, Sudbury; Ram Chandrasekhar, Framingham, all of Mass.

[73] Assignee: Foster-Miller Associates, Inc., Waltham, Mass.

[21] Appl. No.: 166,151

[22] Filed: Jul. 7, 1980

[51] Int. Cl.³ .............................................. C10J 3/52
[52] U.S. Cl. ...................................... 414/217; 48/87; 414/290
[58] Field of Search ............................... 414/217–221, 414/290, 292, 209–211, 213, 216; 406/81, 82; 422/219, 232; 48/87

[56] References Cited

U.S. PATENT DOCUMENTS 2,907,480 10/1959 Vincent ................................ 414/217
2,933,208 4/1960 Green .................................. 414/220
4,247,240 1/1981 Schora et al. ................... 414/290 X Primary Examiner—Robert G. Sheridan
Attorney, Agent, or Firm—Wolf, Greenfield & Sacks

[57] ABSTRACT

A system for removing material from the bottom of a pressure vessel without relieving the vessle's pressure in which a tube connected intermediate its inlet and outlet ends to the pressure vessel receives material through the connection and into pocket means carried by a conveyor running through the tube. The conveyor carries the material to the outlet or discharge of the tube. The pocket means form moving labyrinth seals at each end of the tube for preventing vessel pressure loss through the tube.

19 Claims, 5 Drawing Figures

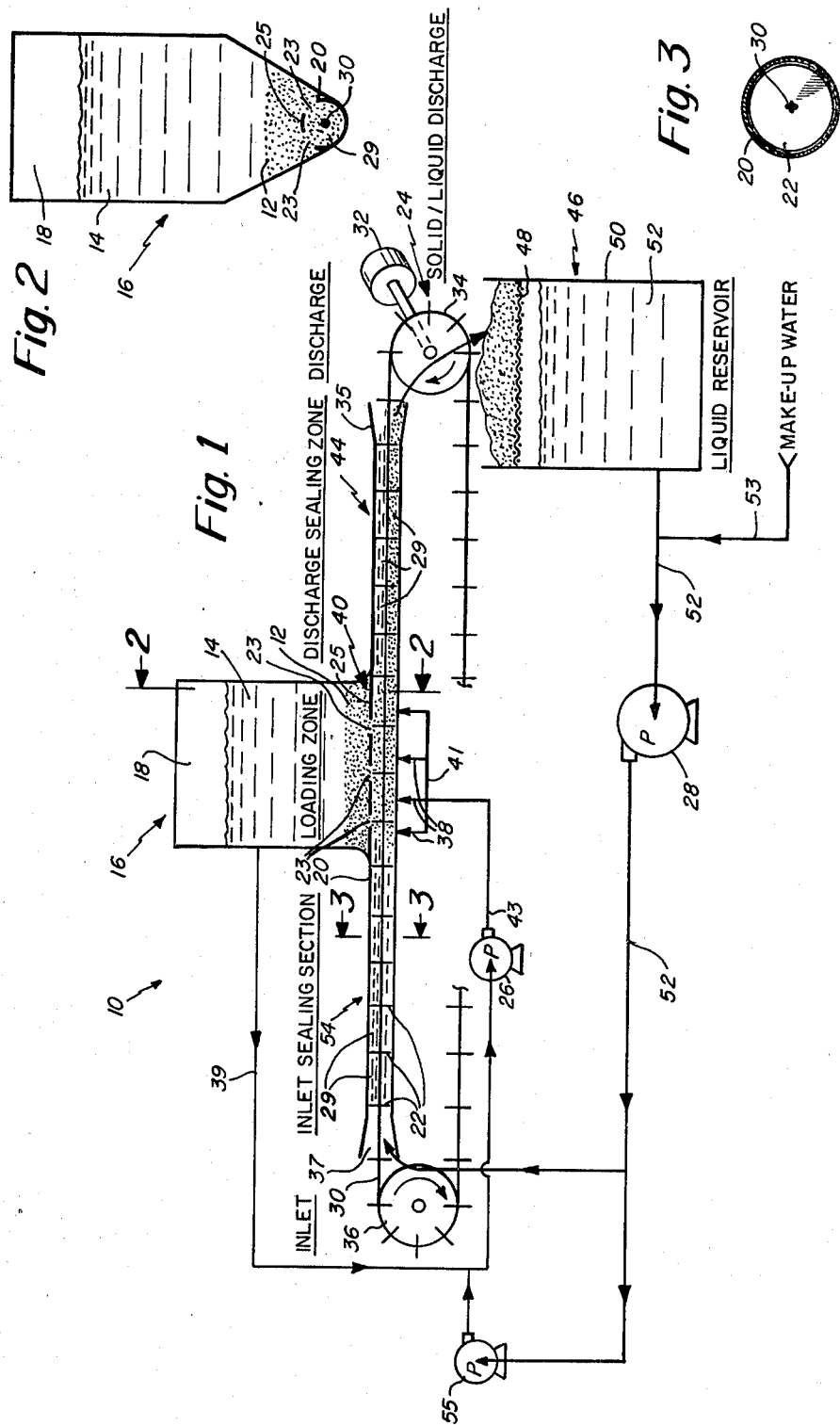

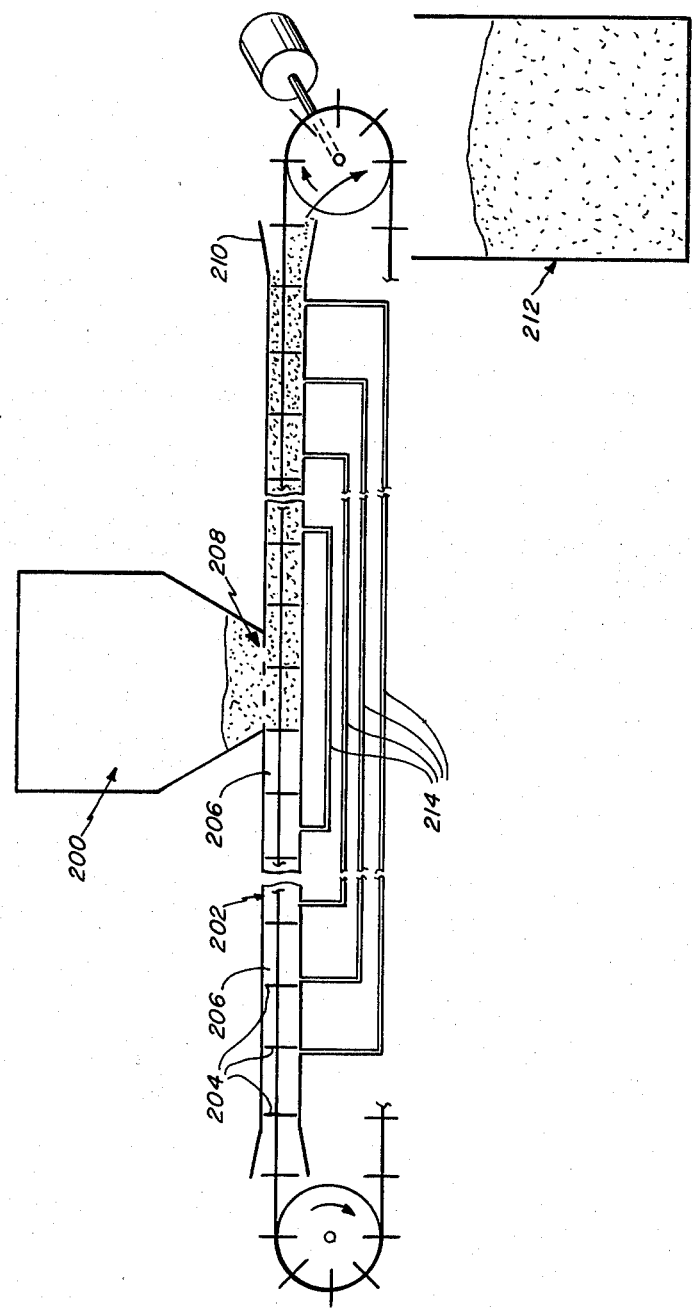

LINEAR POCKET LETDOWN DEVICE

BACKGROUND OF THE INVENTION

The present invention relates to a system for removing material such as solids from a pressurized vessel without relieving the vessel pressure.

In a typical application, such as any pressurized coal gasification process, the ash and slag from the process are dropped into a water bath at the bottom of the reactor vessel. The problem presented is to remove this residue of ash and slag without relieving the pressure in the vessel.

The removal of solids from pressurized vessels is generally accomplished by either one of two systems, referred to as a blow out system and a lock hopper system. The blow out system consists of a choke through which the solids are forced by means of the pressure differential between the vessel interior and exterior. Control of solids flow is effected by varying the choke throat diameter. Some of the drawbacks of this system are the enormous amounts of make-up water required, the inefficient use of energy required for throttling in order to control the flow, and the energy required merely to pressurize the large amount of make-up water needed. The lock hopper system consists of a lock between the vessel interior and exterior through which the solids are passed for removal from the vessel. Enormous energy is expended by this system every time the lock cycles since the transfer of the solids can only be accomplished between areas having equal pressures. In addition to a large energy requirement, the system works as a batch process, which produces a non-linear flow of solids. The resulting temporary back up of solids between lock cycles may create problems within the vessel. Large quantities of make-up water are also required by this system, creating an energy usage that is similar to that found in the blow out system.

In accordance with the present invention, a linear pocket letdown device has been designed to provide for the removal of material from the vessel in such a way as not to relieve the vessel pressure.

An object of the present invention is to provide a substantially more efficient means than any now employed to remove material from pressurized processes.

SUMMARY OF THE INVENTION

The present invention in its preferred embodiment comprises a tube with a plurality of spaced sealing elements disposed within it. Each adjacent pair of sealing elements together define a pocket. The sealing elements are connected by a chain, which is in turn connected to and driven by a chain drive. The chain drive pulls the sealing elements through the tube from one end to the other so that the material in each pocket defined by the adjacent elements is discharged into a receptacle located at the outlet end of the tube. When the material removed from the vessel consists of solids, the receptacle includes a collection screen above a liquid reservoir, and the collection screen may itself be a conveyor to facilitate removing the collected solids away from the site. A pressure tight connection between the tube and the pressure vessel is required to maintain the pressure within the vessel. At the point of transfer of the solids from the vessel to the tube, a pump circulates water from the vessel to the tube to maintain the solids in a fluidized state. This in turn facilitates the flow of solids from the vessel to the tube. A transfer pump is provided to transfer discharged liquid from the liquid reservoir along with any required make-up water to the inlet end of the tube to fill each of the pockets with liquid and thereby create a moving labyrinth seal in the pockets as they move toward the discharge site underneath the pressure vessel. Water leakage is minimized, if not eliminated, by having only a slight clearance between the sealing elements and the tube. It is advantageous for the inner surface of the tube and the surface of the sealing elements to be made of material that is harder than the hardest constituents in the solids which are to be removed, to minimize wear on the internal parts of the conveying device.

BRIEF FIGURE DESCRIPTION

The foregoing objects and advantages of the present invention will be more clearly understood when considered in conjunction with the accompanying drawings in which:

FIG. 1 is a schematic representation of the preferred embodiment of linear pocket letdown device constructed in accordance with this invention.

FIGS. 2 and 3 are cross-sectional views taken along section lines 2—2 and 3—3 in FIG. 1.

FIGS. 4 and 5 are schematic representations of two additional embodiments of linear pocket letdown devices in accordance with this invention.

DETAILED DESCRIPTION

Figure 4:
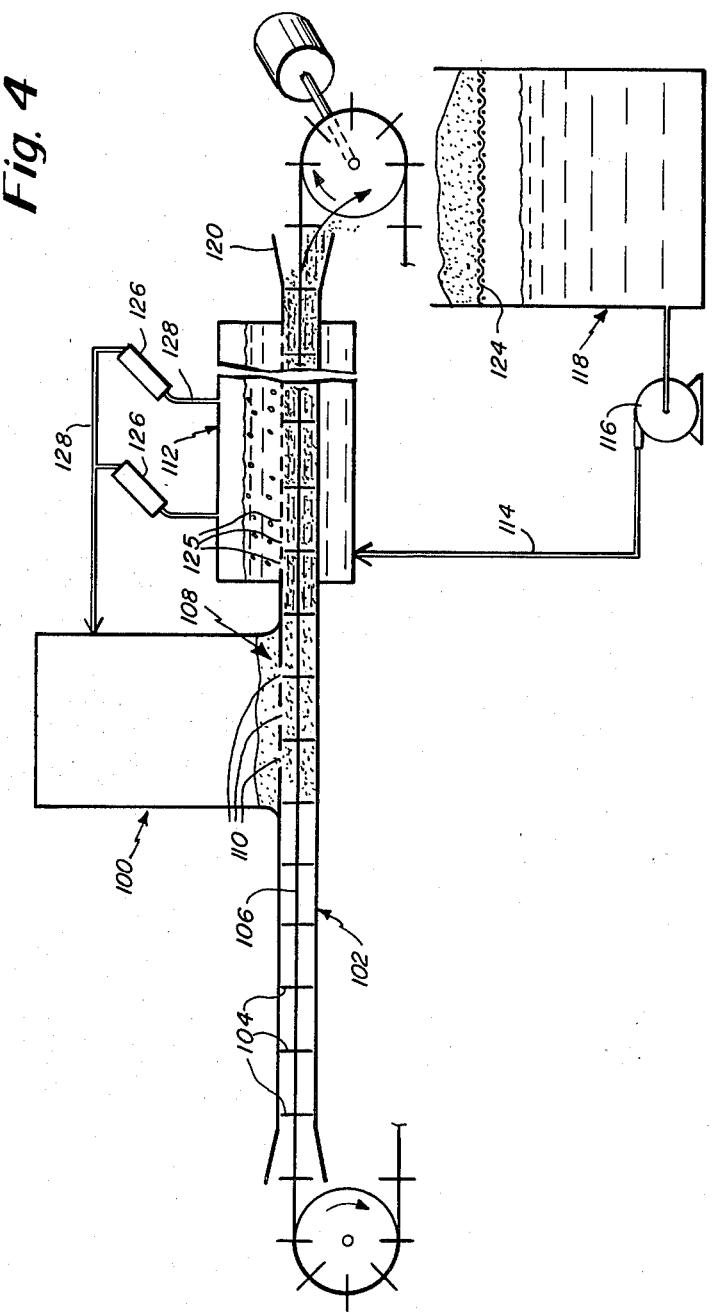

A schematic of the preferred embodiment of linear pocket letdown device 10 is shown in FIG. 1. This schematic shows an embodiment of the device for removing solids 12 such as ash and slag, which have dropped into a high pressure water bath 14 at the bottom of a pressurized reactor vessel 16. Vessel 16 typically represents the reactor vessel of a pressurized coal gasification process with high pressure gas 18 above water bath 14. The letdown solids 12 are the ash and slag residue of the process.

Letdown device 10 consists in part of tube 20, a series of seals or pistons 22, a drive system 24, and two transfer pumps 26 and 28. A pocket 29 is defined by each pair of adjacent seals and the surrounding tube. Depending on the size of reactor vessel 16, there may be a multiplicity of tubes 20, but they would all be similar. The tube 20 is shown to have a number of ports 23 in its upper wall 25 that communicate with the bottom of the vessel 16 to allow the solids in the vessel to drop into the tube. These ports are of course, merely diagrammatic representations of a pressure tight connection between the tube 20 and vessel 16, which may take a variety of forms.

The pistons 22 are fastened to chain 30 which is driven by the drive system 24. Motor 32 drives sprocket 34, located at the discharge end 35 of tube 20. A second sprocket 36 is located at the inlet end 37 of tube 20 and acts as the idler sprocket. The sprockets 34 and 36 define the chain run through the tube. The chain drive system is intended to incorporate all of the necessary appurtenances as are well known to those skilled in the art.

A high case pressure, low differential pump 26 takes water from vessel 16 as suggested by line 39 and injects it through fluidizing jets 38 in the solid loading area 40 of tube 20. The jets are connected to manifold 41 in turn connected to the outlet 43 of the pump. The injection of the recirculated water fluidizes letdown solids 12 in the tube and makes them easier to handle. If the solids are not fluidized, they may tend to bridge and back up into loading zone 40.

Chain 30 and pistons 22 are pulled through tube 20, and the pockets 29 formed between the seals fill with letdown solids as each pocket passes through loading zone 40. After leaving the loading zone the pockets 29 travel through discharge sealing zone 44, and finally discharge their contents of solids and water into a discharge receptacle 46. The discharge receptacle consists of a liquid reservoir 50 covered by a collection screen 48. The solid collection screen may either be a fixed screen or a conveyor screen, the latter embodiment providing means for moving the discharged solids to another site.

The discharged water 51 in liquid reservoir 50 is transferred by pump 28 and associated piping 52 to the inlet sealing section 54 of tube 20 and from there is carried through the loading zone 40 where it mixes with letdown solids. Because the pistons 22 have but a slightly smaller diameter than the tube 20, there is only a limited opening between the two as the pistons move through the tube. The water pumped into the pockets further closes the space between the piston and tube, and a moving labyrinth seal is therefore formed by the water and pistons to contain the pressure within the vessel. A similar labyrinth seal also exits beyond the loading zone at the zone 44.

The water leakage in the inlet sealing section 54 and the discharged zone 44 may be kept at a minimum by minimizing the annular gap between the inner surface of tube 20 and seals 22. The vessel may require a vent since more water may be introduced into the vessel by the pockets than is being taken out in the pockets. The water in the pockets may be displaced upwardly through the ports 23 into the vessel 16 by solids 12 that are deposited in the tube.

Make-up water may be provided in the system through duct 53 connected through pumps 28 and 55 to replace net leakage flow that will occur typically when the solids discharge rate from vessel 16 is low or zero.

In the preferred embodiment, the tube and pistons have surfaces which are harder than the hardest constituent in the letdown solids so as to minimize wear. Soft but tough seals may also be used and may be advantageous in some applications.

The pressure force acting toward the discharge end is inherently balanced by the pressure force acting toward the inlet end, so that although the chain 30 experiences a tension due to pressure load while it is in the tube 20, the only force that the drive system needs to overcome is that of friction.

The embodiment of the invention shown in FIG. 4 differs from that of the preferred embodiment in that it provides for dry ash letdown from the vessel. In this embodiment the vessel 100 is connected to the tube 102, and a series of pistons 104 connected to chain 106 define pockets and move through the tube including the loading station 108, in the same manner as in FIG. 1. The pockets, however, reach the station dry, and the letdown solids are deposited in them through ports 110. The pistons 104 form moving labyrinth seals in the tube ahead of the loading zone.

Downstream of the loading zone 108 the tube 102 passes through a larger cylinder 112 which is connected by means of duct 114 and pump 116 to the reservoir 118 at the discharge end 120 of the tube. Reservoir 118 has a screen 124 to separate the solids from the water discharged from the tube. The tube 102 within cylinder 112 is perforated as shown at 125, and high pressure water pumped into the cylinder flows into pockets containing the letdown solids from the vessel. Gas carried with the solids will bubble up through the water in the cylinder, and the gas may be returned to the vessel 100 through one or more dryers 126 and ducts 128.

In this embodiment the lining of tube 102 and the pistons 104 may be made of a ceramic material, and the letdown solids may be fluidized at the loading zone as in the preferred embodiment if desired.

The system shown in FIG. 5 is a wholly dry process. Once again the high pressure vessel 200 is connected to a tube 202 through which chain driven pistons 204 move. Ash is dropped into the pockets 206 formed by the pistons 204 in loading zone 208, and the pockets carry the ash to the discharge end 210 of the tube where it is deposited in receiver 212.

Pressure equalization lines 214 connect opposite sides of tube 202 on each side of the loading zone 208 so as to equalize the pressure in the pockets 206. The pistons and the inner surface of the tube may be made of a ceramic material, and their close fit form labyrinth seals in the tube to maintain the vessel pressure, as in the other embodiments. The lines 214 balance the pressures acting at each end of the tube so that only friction forces need be overcome to drive the system. This embodiment like the other embodiments employs an endless course for the chain and pistons to provide continuous operation for the system.

This invention provides substantially more efficient material removal from pressurized processes than any means heretofore employed. Having described several embodiments of the present invention, it should be apparent to those skilled in the art that numerous other embodiments are contemplated as falling within the scope of this invention. Therefore, the scope of this invention is not limited to the embodiments illustrated and described, but rather is to be determined by the appended claims and their equivalents.

What is claimed is:

1. A system for removing solid material from the bottom of a pressure vessel and discharging the solids to ambient conditions without relieving the vessel's pressure comprising a tube having an inlet end and an outlet end and connected intermediate its ends to the bottom of the pressure vessel for receiving the material from the vessel, a conveyor having a course which travels through the tube, motor means connected to the conveyor for driving it along its course, pocket means defined by consecutive pairs of pistons carried by the conveyor for conveying the material received in the tube from the vessel and carrying the material to the outlet of the tube, labyrinth seals formed by the pistons in the tube both upstream and downstream of the vessel for preventing vessel pressure loss through the inlet and outlet ends of the tube, a small annular clearance being formed between the pistons and the tube, and means for introducing liquid into the pockets at the inlet end of the tube upstream of the vessel, said liquid cooperating with the pistons to form moving labyrinth seals upstream of said vessel.

2. The removal system of claim 1 further characterized by the tube inner surface and the pocket means being a material which is harder than the hardest constituents in the material which is to be removed.

3. A system for removing solid material from the bottom of a pressure vessel and discharging the solid material to ambient conditions without relieving the vessel's pressure comprising a tube having a inlet end and an outlet end and connected intermediate its ends to the bottom of the pressure vessel for receiving the solid material from the vessel, a conveyor having a course which travels through the tube, motor means connected to the conveyor for driving it along its course, pocket means carried by the conveyor for conveying the solid material received in the tube from the vessel and carrying the solid material to the outlet end of the tube, labyrinth seals formed by the pocket means in the tube both upstream and downstream of the vessel for preventing vessel pressure loss through the inlet and outlet ends of the tube, a solids discharge receiving means at the outlet end of the tube, a liquid source, a liquid transfer pump and associated piping for transferring liquid from the liquid source to the pocket means at the inlet end of the tube, said liquid cooperating with the pistons to form moving labyrinth seals in the tube upstream of the vessel.

4. The solids removal system of claim 3 further characterized by the solids discharge receiving means being a discharge receptacle having a liquid reservoir covered by a collection screen, and said liquid source being the liquid reservoir.

5. A linear pocket letdown device for removing solids from the bottom of a pressurized water bath at the bottom of a pressurized vessel without relieving the vessel pressure comprising a tube having an inlet end and an outlet end, a plurality of spaced pistons within the tube, the pistons being capable of carrying water at the inlet and outlet ends of the tube, pressure tight connecting means intermediate the tube ends for connecting the tube to the pressure vessel for receiving solids from the vessel, the pistons in cooperation with the water forming labyrinth seals at the inlet and outlet ends for preventing vessel pressure loss through the inlet and outlet ends of the tube, a plurality of pockets defined by each consecutive pair of pistons, a chain connecting the pistons, a chain drive pulling the pistons through the tube from the inlet to the outlet end, a discharge receptacle located at the outlet end of the tube having a solids collection screen above a liquid reservoir, a fluidizing circulation pump and associated piping connecting the vessel water bath with the tube adjacent the pressure tight connecting means and pumping from the vessel into the tube, and a transfer pump and associated piping connecting the discharge receptacle liquid reservoir with the inlet end of the tube, whereby the chain drive moves the pistons through the tube and the fluidized solids collect in the pockets as they pass the pressure tight connecting means between the tube and the vessel, discharging the solids through the outlet end of the tube onto the discharge receptacle collection screen, while the fluidizing circulation pump keeps the solids in motion as they collect in the pockets and the transfer pump moves water from the discharge receptacle liquid reservoir to the inlet end of the tube.

6. The linear pocket letdown device of claim 5 further characterized by the tube inner surface and the pistons being of a material which is harder than the hardest constituents in the solids being removed from the vessel.

7. The linear pocket letdown device of claim 5 further characterized by a small annular clearance between the edges of the sealing elements and the inner surface of the tube.

8. A linear pocket letdown device for removing the ash and slag that are dropped into a water bath at the bottom of a reactor vessel used in a pressurized coal gasification process without relieving the vessel pressure comprising a tube having an inlet end and an outlet end, a pressure tight connection intermediate the tube ends to the reactor vessel for receiving ash and slag from the water bath in the reactor vessel, the tube inner surface being a material which is harder than the hardest constituents in the ash and slag which is removed, a plurality of spaced pistons within the tube, the pistons being capable of carrying water at the inlet and outlet ends of the tube, the pistons in cooperation with the water forming labyrinth seals at the inlet and outlet ends for preventing vessel pressure loss through the inlet and outlet ends of the tube, the pistons being made of material which is also harder than the hardest constituents in the ash and slag which is removed, a small annular clearance between the pistons and the inner surface of the tube, a plurality of pockets defined by each consecutive pair of pistons, a chain connecting the pistons, a drive for the chain for pulling the pistons through the tube from the inlet to the outlet end, a discharge receptacle located at the outlet end of the tube having ash and slag collection screen above a liquid reservoir, a high case pressure, low differential, fluidizing circulation pump and associated piping connecting the rector vessel water bath with the tube adjacent the pressure tight connection and pumping from the reactor vessel water bath into the tube, a transfer pump and associated piping connecting the discharge receptacle liquid reservoir with the inlet end of the tube, whereby the chain drive moves the pistons through the tube, the fluidized ash and slag collect in the pockets as they pass the pressure tight connection between the tube and the reactor vessel, the ash and slag is discharged through the outlet end of the tube onto the discharge receptacle collection screen while the transfer pump moves water from the discharge receptacle liquid reservoir to the inlet end of the tube and the fluidizing circulation pump keeps the ash and slag in motion as it collects in the pockets.

9. The linear pocket letdown device of claim 8 further characterized by the transfer pump moving a mixture of make-up water and discharge receptacle liquid reservoir liquid into the inlet end of the tube.

10. A system for removing solid material from the bottom of a pressure vessel and discharging the solids to ambient conditions without relieving the vessel's pressure comprising a tube having an inlet end and an outlet end and connected intermediate its ends to the bottom of the pressure vessel for receiving the material from the vessel, a conveyor having a course which travels through the tube, motor means connected to the conveyor for driving it along its course, pocket means carried by the conveyor for conveying the material received in the tube from the vessel and carrying the material to the outlet of the tube, labyrinth seals formed by the pockets in the tube both upstream and downstream of the vessel for preventing vessel pressure loss through the inlet and outlet ends of the tube, and means for introducing liquid under pressure into the pockets after the pockets receive the material from the vessel.

11. A linear pocket letdown device for removing solids from the bottom of a pressurized vessel without relieving the vessel pressure comprising a tube having an inlet end and an outlet end, a plurality of spaced pistons within the tube, the pistons being capable of carrying water at the inlet and outlet ends of the tube, pressure tight connecting means intermediate the tube ends for connecting the tube to the pressure vessel for receiving solids from the vessel, the pistons in cooperation with the water forming labyrinth seals at the inlet and outlet ends for preventing vessel pressure loss through the inlet and outlet ends of the tube, a plurality of pockets defined by adjacent pairs of pistons, a chain connecting the pistons, a chain drive pulling the pistons through the tube from the inlet to the outlet end, a collection station located at the outlet end of the tube for collecting solids discharged at the outlet by the pockets, a fluidizing circulation pump means and associated piping connected to the tube adjacent the pressure tight connecting means for pumping liquid into the tube, and second pump means and associated piping connected to the inlet end of the tube for pumping liquid into the pockets at the inlet end, whereby the chain drive moves the pistons through the tube and fluidized solids collect in the pockets at the connecting means between the tube and the vessel, discharging the solids through the outlet end of the tube at the collection station, while the fluidizing circulation pump means keeps the solids in motion as they collect in the pockets and the second pump means moves water to the inlet end of the tube.

12. The linear pocket letdown device of claim 11 further characterized by the tube inner surface and the pistons being of a material which is harder than the hardest constituents in the solids being removed from the vessel.

13. The linear pocket letdown device of claim 11 further characterized by a small annular clearance between the edges of the sealing elements and the inner surface of the tube.

14. A system for removing solid material from the bottom of a pressure vessel and discharging the solid material to ambient conditions without relieving the vessel's pressure, said system comprising:
   a tube having an inlet end and an outlet end and connected intermediate its ends to the bottom of the pressure vessel for receiving the solid material from the vessel;
   a conveyor having a course which travels through the tube,
   motor means connected to the conveyor for driving it along its course;
   pocket means carried by the conveyor for conveying the solid material received in the tube from the vessel and carrying the solid material to the outlet end of the tube;
   labyrinth seals formed by the pocket means in the tube both upstream and downstream of the vessel for preventing vessel pressure loss through the inlet and outlet ends of the tube;
   a solids fluidizing means connected to the tube intermediate the inlet and outlet ends for fluidizing the solid materials in the tube as they are received from the vessel; and
   a solid material discharge receiving means disposed at the outlet end of the tube.

15. The solids removal system of claim 14 further characterized by said pressure vessel containing the solids in a water bath, the solids fluidizing means being a pump and associated piping circulating water from the pressure vessel to the connection between the tube and the pressure vessel so as to maintain the solids in a fluidized state.

16. The solids removal system of claim 15 further characterized by the pump being a high case pressure, low differential pump.

17. A system for removing solid material from the bottom of a pressure vessel and discharging the solid material to ambient conditions without relieving the vessel's pressure, said system comprising:
   a tube having an inlet end and an outlet end and being connected intermediate its ends in a loading zone to the bottom of the pressure vessel for receiving the solid material from the vessel;
   a conveyor having a course which travels through the tube;
   motor means connected to the conveyor for driving it along its course;
   pocket means carried by the conveyor for conveying the solid material received in the tube from the vessel and carrying the solid material to the outlet end of the tube;
   labyrinth seals formed by the pocket means in the tube both upstream and downstream of the vessel for preventing vessel pressure loss through the inlet and outlet ends of the tube;
   a pressure chamber surrounding the tube downstream of the loading zone;
   a liquid reservoir and pump and associated piping connecting the reservoir to the pressure chamber for pumping liquid under pressure from the reservoir to the pressure chamber;
   means for enabling liquid in the chamber to flow into the pockets within the tube disposed inside the pressure chamber; and
   a solid material discharge receiving means disposed at the outlet end of the tube.

18. A system as defined in claim 17 further characterized, by said pockets discharging the solid material and liquid into the discharge receiving means,
   and said reservoir forming part of said receiving means.

19. A system as defined in claim 18 further characterized by a duct connecting the chamber to the vessel for transferring any gas in the chamber to the vessel.

* * * * *